(12) United States Patent
Spivak et al.

(10) Patent No.: US 11,327,649 B1
(45) Date of Patent: May 10, 2022

(54) FACILITATING SELECTION OF KEYS RELATED TO A SELECTED KEY

(71) Applicant: Amazon Technologies, Inc., Seattle, WA (US)

(72) Inventors: Maxim Spivak, San Jose, CA (US); Dion M. Isselhardt, Saratoga, CA (US); Mark S. Tamura, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 681 days.

(21) Appl. No.: 14/622,202

(22) Filed: Feb. 13, 2015

Related U.S. Application Data

(63) Continuation of application No. 13/238,804, filed on Sep. 21, 2011, now Pat. No. 8,959,430.

(51) Int. Cl.
  *G06F 3/0488* (2013.01)
  *G06F 3/04886* (2022.01)
(52) U.S. Cl.
  CPC .............................. *G06F 3/04886* (2013.01)
(58) Field of Classification Search
  CPC .... G06F 3/048; G06F 3/04883; G06F 9/4443; G06F 16/20; G06F 16/30; G06F 17/20; G06F 17/30; G06F 3/01; G06F 3/04; G06F 15/0225; G06F 1/1673; G06F 3/04; G06F 1/1692; G06F 3/01; G06F 3/0426; G06F 3/04886
  See application file for complete search history.

(56) References Cited

U.S. PATENT DOCUMENTS

| | | | | |
|---|---|---|---|---|
| 5,977,969 A | * | 11/1999 | DiAngelo | G06F 17/276 715/780 |
| 7,383,342 B2 | * | 6/2008 | Spriestersbach | G06F 3/0219 345/168 |
| 7,614,008 B2 | * | 11/2009 | Ording | G06F 3/04883 345/173 |
| 2003/0154292 A1 | * | 8/2003 | Spriestersbach | G06F 3/0219 709/228 |
| 2005/0190970 A1 | * | 9/2005 | Griffin | G06F 3/0237 382/209 |
| 2006/0053387 A1 | * | 3/2006 | Ording | G06F 3/04883 715/773 |
| 2007/0040813 A1 | * | 2/2007 | Kushler | G06F 3/0237 345/173 |
| 2008/0040753 A1 | * | 2/2008 | Anandpura | H04N 7/17318 725/60 |
| 2008/0094368 A1 | * | 4/2008 | Ording | G06F 3/0488 345/173 |

(Continued)

OTHER PUBLICATIONS

Office action for U.S. Appl. No. 13/238,804, dated Oct. 9, 2013, Spivak et al., "Facilitating Selection of Keys Related to a Selected Key," 10 pages.

(Continued)

*Primary Examiner* — Sanchita Roy
(74) *Attorney, Agent, or Firm* — Lee & Hayes, P.C.

(57) ABSTRACT

Described herein are techniques for rendering additional keys on a display of an electronic device based on one or more characteristics of a user's selection of another key. After rendering the additional keys, the user may thereafter select one of the additional keys now available and rendered on the display.

19 Claims, 13 Drawing Sheets

(56) References Cited

U.S. PATENT DOCUMENTS

| | | | | |
|---|---|---|---|---|
| 2008/0098331 A1* | 4/2008 | Novick | G06F 3/0233 | 715/835 |
| 2008/0122796 A1* | 5/2008 | Jobs | G06F 3/0488 | 345/173 |
| 2008/0174570 A1* | 7/2008 | Jobs | G06F 3/0488 | 345/173 |
| 2009/0058823 A1* | 3/2009 | Kocienda | G06F 3/04886 | 345/173 |
| 2009/0222445 A1* | 9/2009 | Tavor | G06F 40/126 | |
| 2010/0103127 A1* | 4/2010 | Park | G06F 3/04886 | 345/173 |
| 2011/0037718 A1* | 2/2011 | Stephanick | G06F 3/0236 | 345/173 |
| 2011/0163973 A1* | 7/2011 | Ording | G06F 3/0236 | 345/173 |
| 2011/0210926 A1* | 9/2011 | Pasquero | G06F 3/016 | 345/173 |
| 2011/0302518 A1* | 12/2011 | Zhang | G06F 3/0234 | 715/773 |
| 2012/0133484 A1* | 5/2012 | Griffin | G06F 21/51 | 340/5.54 |
| 2012/0174041 A1* | 7/2012 | Queru | B60K 37/06 | 715/863 |
| 2012/0206357 A1* | 8/2012 | Vandeputte | G06F 3/0488 | 345/163 |
| 2012/0210261 A1* | 8/2012 | Sarnoff | G06F 3/04845 | 715/765 |
| 2012/0212422 A1* | 8/2012 | Fang | H04M 1/0254 | 345/173 |
| 2012/0218190 A1* | 8/2012 | Pechanec | G06F 3/0416 | 345/173 |
| 2012/0235930 A1* | 9/2012 | Lazaridis | G06F 3/017 | 345/173 |
| 2012/0271877 A1* | 10/2012 | Nicks | H04L 61/609 | 709/203 |
| 2012/0290287 A1* | 11/2012 | Fux | G06F 3/04883 | 704/8 |
| 2012/0306767 A1* | 12/2012 | Campbell | G06F 3/04886 | 345/173 |
| 2012/0311476 A1* | 12/2012 | Campbell | G06F 3/04886 | 715/773 |
| 2013/0019191 A1* | 1/2013 | Arnold | G06F 3/04886 | 715/765 |
| 2013/0145295 A1* | 6/2013 | Bocking | G06F 3/017 | 715/764 |
| 2013/0246329 A1* | 9/2013 | Pasquero | G06F 3/04886 | 706/52 |
| 2014/0052437 A1* | 2/2014 | Longe | G06F 40/232 | 704/9 |

OTHER PUBLICATIONS

Office Action for U.S. Appl. No. 13/238,804, dated May 8, 2014, Maxim Spivak, "Facilitating Selection of Keys Related to a Selected Key," 11 pages.

* cited by examiner

FACILITATING SELECTION OF KEYS RELATED TO A SELECTED KEY

RELATED APPLICATION

This application is a continuation of and claims priority to U.S. patent application Ser. No. 13/238,804, filed on Sep. 21, 2011, the disclosure of which is incorporated by reference herein.

BACKGROUND

The continued proliferation of digital content items has led to an increase in the availability of such items, as well as an increase in the availability of electronic devices used for consuming these items. For instance, users now consume electronic books, videos, songs, and the like on an assortment of stationary and/or portable electronic devices. As the number of items and devices continues to increase, users become increasingly interested in enhancing their experiences while consuming these items.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 1 illustrates an example electronic device configured to facilitate selection of keys related to an initially selected key. As illustrated, the example device includes functionality to detect a user's selection of a key on a virtual keyboard and, in response, surface an additional row of keys as part of the virtual keyboard, with the newly surfaced keys relating to the selected key. In this example, the user selects a key representing a domain (".com") and, in response, the device surfaces additional domains that the user may select from.

FIG. 2A, for instance, illustrates the device rendering the additional row of keys in response to a user selecting and holding the key for a duration of time that is greater than a threshold duration. FIG. 2B, meanwhile, illustrates the device rendering the additional row of keys in response to a user selecting the key with an amount of force that is greater than a threshold amount of force.

FIG. 3A, for instance, illustrates the user selecting a letter and, in response, the device surfacing an additional row of keys, with each of the keys representing the letter and a respective diacritic. FIG. 3B, meanwhile, illustrates the user selecting a symbol (here, a dollar sign) and, in response, the device surfacing an additional row of keys, with each of the keys representing a symbol within a same class as the selected symbol (here, symbols for other types of currency).

DETAILED DESCRIPTION

Figure 1:
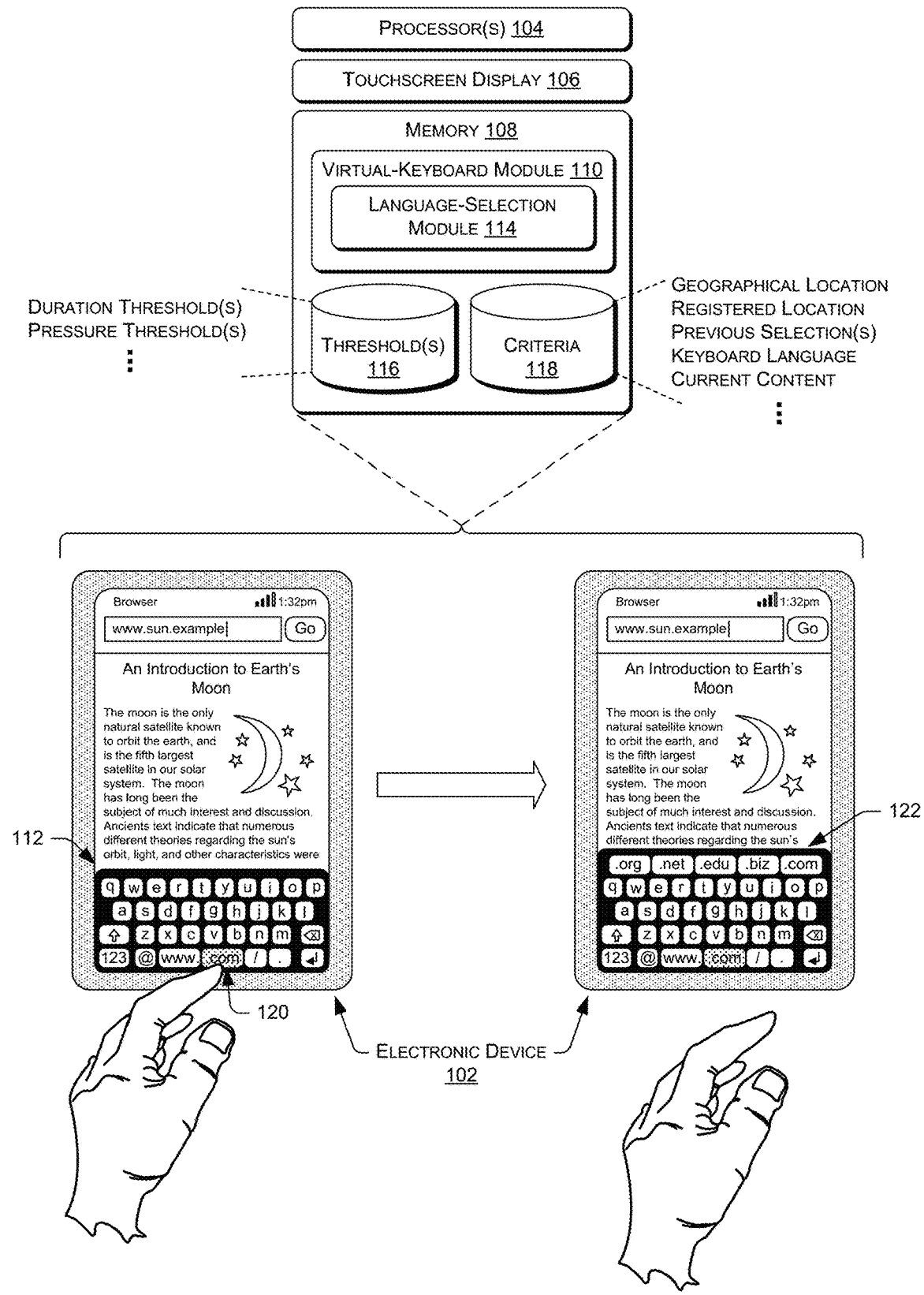

This disclosure is directed, in part, to techniques for rendering additional keys on a display of an electronic device based on one or more characteristics of a user's selection of another key. After rendering the additional keys, the user may thereafter select one of the additional keys now available and rendered on the display.

For instance, a device utilizing the techniques described herein may render a virtual keyboard comprising multiple different keys arranged in rows on a touchscreen display. The keys of the virtual keyboard may represent an array of different letters, numbers, symbols, or other graphical elements. In one example, the virtual keyboard comprises elements of a traditional "QWERTY" keyboard, while in another example the virtual keyboard comprises a keyboard representing an array of different numbers and symbols (e.g., 1, 2, 3, @, #, S, etc.). Furthermore, in instances where the virtual keyboard includes letters and/or numbers, the keyboard may be associated with any language and, therefore, may depict the letters and/or numbers in any language.

Regardless of an exact layout of a particular virtual keyboard, a user may interact with the virtual keyboard by providing user inputs (i.e., "touches") on the touchscreen display. For instance, if the user wishes to type with use of the virtual keyboard, the user may select keys on the keyboard by providing touches at locations corresponding to the desired keys on the keyboard. In response to identifying a user touch on the touchscreen display at a location corresponding to a particular key, the device may accordingly process this selection. For instance, if the user selects a key that represents the letter "a" and the user is currently providing input to a text box rendered on the touchscreen display, then the device may render an "a" in the text box according to the user's selection. Or, if the user selects a return key on the virtual keyboard, then the device may accordingly perform a certain instruction depending on the context in which the user is currently operating the device. For example, if the device is rendering a web page of a search engine and the user has entered a query into a corresponding text box, then the device may send the search query to the search engine in response to the user selecting the enter key.

In addition, using the techniques described herein a device may detect certain characteristics of a user's selection and, in response, may render additional keys based on these characteristics. For instance, when a user provides a touch on a particular key of the virtual keyboard and holds this touch for an amount of time that is greater than a threshold, the device may output (e.g., render on the display) one or more additional keys related to the selected key. In other instances, a user may select and hold multiple keys for an amount of time that is greater than the threshold and, in response, the device may output one or more additional keys related to the initially selected combination of keys.

For instance, envision that a device renders a virtual keyboard having a key entitled ".com". When a user touches and releases the ".com" key in a routine manner, the device may render this text at a location of focus of an application currently running on the device. For instance, if a user is attempting to type in a Uniform Resource Locator (URL) address into an address bar of a browser, then the device may render the text ".com" in response to the user touching and releasing the ".com" key. If, however, the user selects and holds this key for an amount of time that is greater than a threshold amount of time, the device may render a user interface (UI) element facilitating selection of one or more related keys. For instance, the device may render an additional row of keys consisting of additional domains, such as ".uk", ".org", ".net", and the like. After the device renders these additional keys, the user may select a desired key and, in response, the device may render the selection in the address bar (e.g., ".uk").

In another example, a user may select and hold a key representing a particular letter of the alphabet. In response, the device may render versions of the selected letter including respective diacritics. In still another example, a user may select multiple keys and the device may, in response, render one or more keys related to the initially selected combination of keys. For instance, envision that a user selects and holds the numbers "2" and "3" on a keyboard. In response, the device may render an additional row of keys including multiple related keys, such as keys representing the fractions "⅔" and "3/2", as well as a representation of the number two cubed (i.e., $2^3$) and a representation of the number three squared (i.e., $3^2$). Of course, while one example has been provided, it is to be appreciated that any other combinations of keys may be selected resulting in the rendering of any type of related key(s).

While the devices described herein may reference the duration of a touch when determining whether to surface these additional keys, in some instances these devices may additionally or alternatively reference one or more other characteristics. For example, a device may determine or estimate an amount of pressure or force of a user's touch and, in response to this force being greater than a threshold force, the device may surface the UI element described above. Therefore, when a user gently selects the ".com" key from above, the device may enter the text ".com" into the address bar. However, when the user presses the ".com" key more firmly (more than the force threshold), the device may surface the additional row of keys representing the different domains.

Furthermore, the devices implementing the described techniques may utilize a physical keyboard in addition to or in lieu of a virtual keyboard. For instance, envision that an electronic device includes a physical keyboard with the described ".com" button. When a user selects and releases the button relatively quickly, the device may render the text ".com" on a display of the device. However, when the device determines that a user has selected and held down the ".com" button for greater than a threshold amount of time, then the device may render one or more additional keys on the display of the device (e.g., additional domains). The user may then select one or more of the keys, either via a touch (when the device implements a touchscreen) or via selection of another physical button of the device (e.g., a five-way controller, a keyboard button, etc.).

FIG. 1 illustrates an example electronic device 102 configured to facilitate selection of keys related to an initially selected key. The electronic device 102 may comprise any sort of stationary or portable electronic device, such as a tablet computing device, an electronic book (eBook) reader, a mobile phone, a multifunctional device, a desktop computer, a laptop computer, a game console, a personal media player, or the like. The electronic device 102 may be configured to output an array of different types of content, such as images, text, videos, audio files, and/or any other type of content.

As illustrated, the electronic device 102 includes one or more processors 104, a touchscreen display 106, and memory 108. The device may additionally or alternatively include one or more other input devices that allow a user to operate the electronic device 102, such as a physical keyboard or any other type of input device. In this example, the memory 108 stores or otherwise has access to a virtual-keyboard module 110 that functions in part to render a virtual keyboard 112 on the touchscreen display 106. The memory 108 (and other memories described herein) stores a number of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

As illustrated, the virtual keyboard 112 comprises multiple keys arranged in rows, which may include an array of the illustrated keys and/or one or more non-illustrated keys (e.g., a space bar, numbers, etc.). As is known, a touch controller associated with the touchscreen display 106 may interpret user touches on the display in accordance with the virtual keyboard. For instance, a user of a virtual keyboard may type on the device 102 by touching the display 106 at locations corresponding to keys on the keyboard. Furthermore, in this example the virtual-keyboard module 110 includes a language-selection module 114 that allows a user of the device to select amongst keyboards of multiple different languages. In this example, the device 102 currently renders an English keyboard.

As described above, the device 102 may render additional keys as part of the virtual keyboard 112 based on identifying one or more predefined characteristics associated with a user's touch on the keyboard. For instance, the device 102 may surface an additional row of keys in response to a user pressing and holding a key on the keyboard, pressing the key with an amount of force that is greater than a threshold, and/or the like. Furthermore, in some instances the device 102 may tailor both the identity and order of the newly surfaced keys based on one or more criteria, such as user preferences or the like.

In this regard, FIG. 1 illustrates that the memory 108 further stores or has access to a datastore 116 storing one or more threshold values and a datastore 118 storing one or more criteria that the device may reference when surfacing additional keys. As illustrated, the thresholds may include, but are not limited to, duration and force thresholds. The criteria referenced by the device when surfacing the additional keys, meanwhile, may include a current geographical location of the device, a registered location associated with the device, previous key selections made by a user of the device, a language of the virtual keyboard 112, content currently being rendered on the display 106, and/or other type of criteria.

To illustrate, the virtual-keyboard module 110 may be configured to receive an indication of a user's touch on the display 106 along with a duration of the touch. For instance, a controller associated with the touchscreen display 106 may provide an indication that a user of the device 102 has provided a touch 120 on the display 106 at a location on the display 106 corresponding to the ".com" key of the virtual keyboard. In addition, the module 110 may receive an indication of a duration of this touch 120. In response, the module 110 may compare this duration to a duration threshold to determine whether the user's touch 120 is greater or lesser than the threshold. This duration threshold may be fixed or configurable, and may comprise any length of time (e.g., 100 milliseconds (ms), 400 ms, 1 second (s), 5 s, etc.).

In response to determining that the duration of the touch 120 is less than the threshold, the module 110 may interpret the touch 120 as a routine selection of the ".com" key and, in this example, may render the text ".com" in the address bar that the user currently types in. In response to determining that the duration of the touch 120 is greater than this threshold, however, the module 110 may render an additional row of keys 122 as part of the virtual keyboard. For instance, the additional row 122 may include one or more domains in addition to the initially selected ".com" domain. These domains may include generic top-level domains (e.g., ".org", ".net", ".edu", etc.), country code top-level domains (e.g., ".uk.", ".de", ".fr", etc.), other types of top-level domains, or combinations thereof. Additionally or alternatively, the additional row 122 and or the initially selected key may include second-level domains (e.g., @example1, @example2, etc.) and/or any other type of domain.

In some instances, the virtual-keyboard module 110 may render the additional row of keys 122 at least partly with reference to one or more criteria. For instance, the module 110 may reference a current geographical location of the device (e.g., via GPS data, triangulation, wireless signals, etc.) and may determine which keys to output and/or an order of the keys based on this location. For instance, if the module 110 determines that the device is currently operating in the United Kingdom, then the module 110 may output ".uk" as the first-listed domain in the additional row 122. Additionally or alternatively, the module 110 may reference a registered location of the device 102. For instance, when a user initially purchased this device, the user may have associated a user location with the device. For instance, upon obtaining the device, the user of the device may have initially registered the device with a content store associated with a particular geography (e.g., a content store associated with US customers, UK customers, etc.). Again, if the user indicated that she is from the United Kingdom (e.g., by registering with the UK content store, registering with a physical address in the UK, or in any other manner), then the module 110 may take this into account and may render the ".uk" domain prominently within the additional row 122.

In other instances, the module 110 may store previous user selections of keys within the row 122 and may utilize this data when determining which keys to surface and/or an order in which to surface them. For instance, if the module 110 determines that a particular user associated with the device (either permanently or during a current session) most often selects the ".org" domain after pressing and holding the ".com" key, then the module 110 may list this domain first or may otherwise highlight this domain within the row.

In another example, the module 110 may take into account the current language of the virtual keyboard 112. For instance, if the user were currently operating a French keyboard, then the module 110 may render a ".fr" domain within the additional row of keys 122.

In yet other instances, the module 110 may reference the content currently being rendered on the display 106, potentially along with a user's history of consumed content. For instance, if the user is currently rendering content associated with a ".edu" domain, and the user often visits websites having the ".edu" domain, then the module 110 may surface this domain first or more prominently within the row 122.

Furthermore, the module 110 may take into account what the user has previously typed into the address bar for the purpose of determining which domains to surface. In the illustrated example, the user appears to be navigating from a webpage discussing the moon to a webpage discussing the sun, as evidenced by the text "www.sun.example" within the address bar. After the user types this text and then presses and holds the ".com" key, the module 110 may perform a dynamic lookup to determine domains associated with the text typed by the user within the address bar. For instance, the module 110 may dynamically look up "www.sun.example.com", "www.sun.example.edu", "www.sun.example.org", "www.sun.example.uk", and so forth. The module 110 may then identify which URL addresses host a valid webpage and which do not. Then module 110 may then filter out those domains associated with the URL addresses that do not host such a webpage.

In yet another example, the module 110 may filter out one or more domains according to parental controls. For instance, if a user currently authenticated with the device is a child, the module 110 may refrain from rendering a ".xxx" domain, in accordance with previously set parental controls. Of course, while a few example criteria have been listed, it is to be appreciated that the virtual-keyboard module 110 may select, sort, and/or filter domains or other keys based on any other type of criteria.

In some instances, the virtual-keyboard module 110 may also dynamically predict one or more words that a user is typing while the user types text into a text box, such as the illustrated address bar. After predicting one or more words, the module 110 may then render the word determined to be the most likely word that the user is typing into the text box, in addition to one or more other predicted words as an additional row above the virtual keyboard 112. The module 110 may make these predictions based on words previously typed by the user (e.g., URLs previously entered into the address bar), words previously typed by other users (e.g., URLs previously entered by other users), or with reference to any other criteria.

For instance, as a user types the words "www.exa" into the address bar, the module 110 may dynamically predict that the user is attempting to type the address "www.example.com" based on the user having previously visited this site or based on other users having often visited this site. As such, the module 110 may automatically populate the user's address bar to include "www.example.com" after the user types "www.exa". In addition, the module 110 may surface one or more other predicted words as an additional row above the virtual keyboard. For instance, the module 110 may surface URLs associated with other websites, such as "www.exactscience.example.com", "www.exacto.example.com", or the like. Similar to the discussion above, the module 110 may weight, sort, and/or filter these words (e.g., URL addresses) based on the history of the user, the overall traffic to these sites, and/or based on an array of other criteria.

Figure 2A:
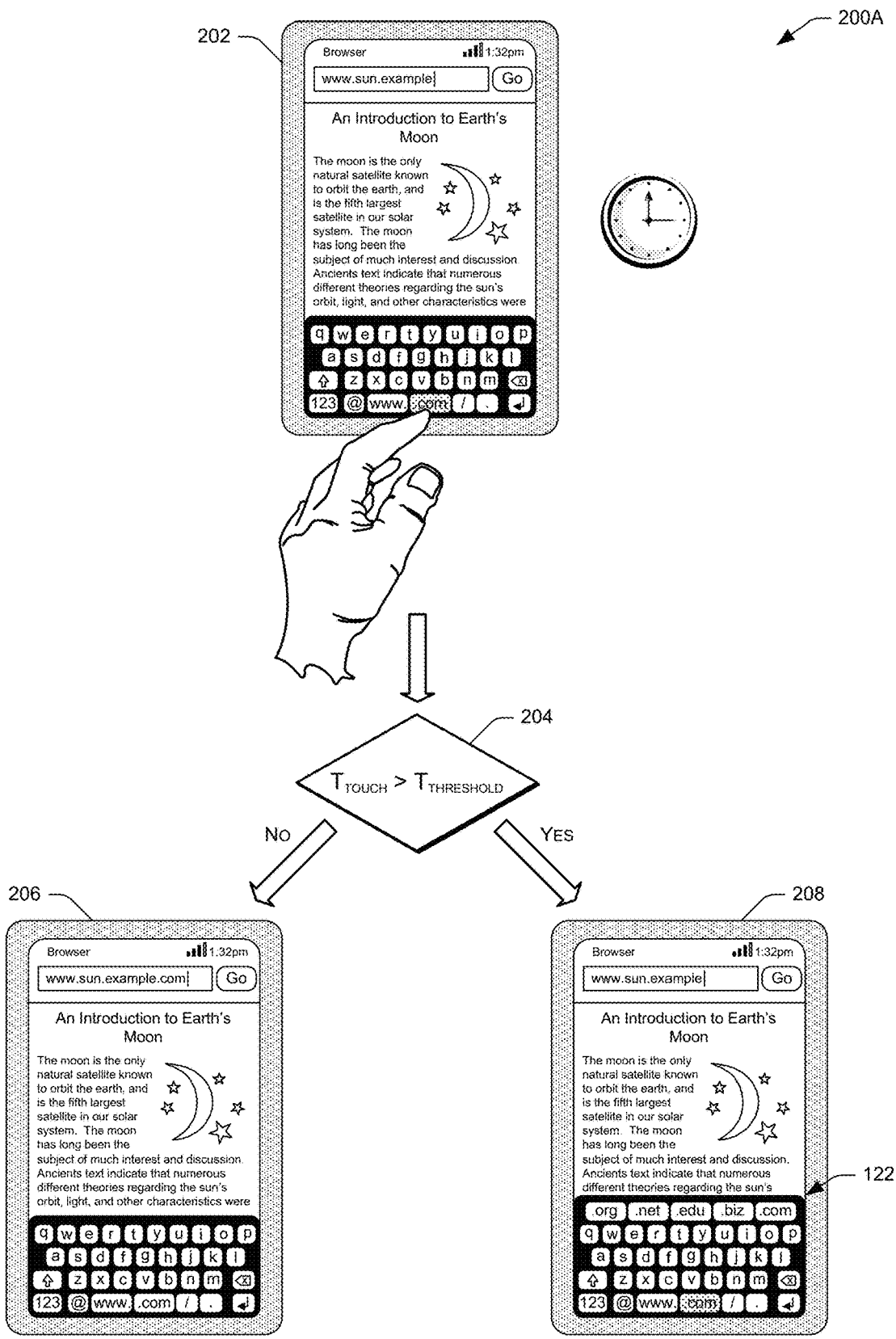
FIGS. 2A-B illustrate examples for surfacing keys related to a selected key based on a characteristic of a user's selection.
Figure 2B:
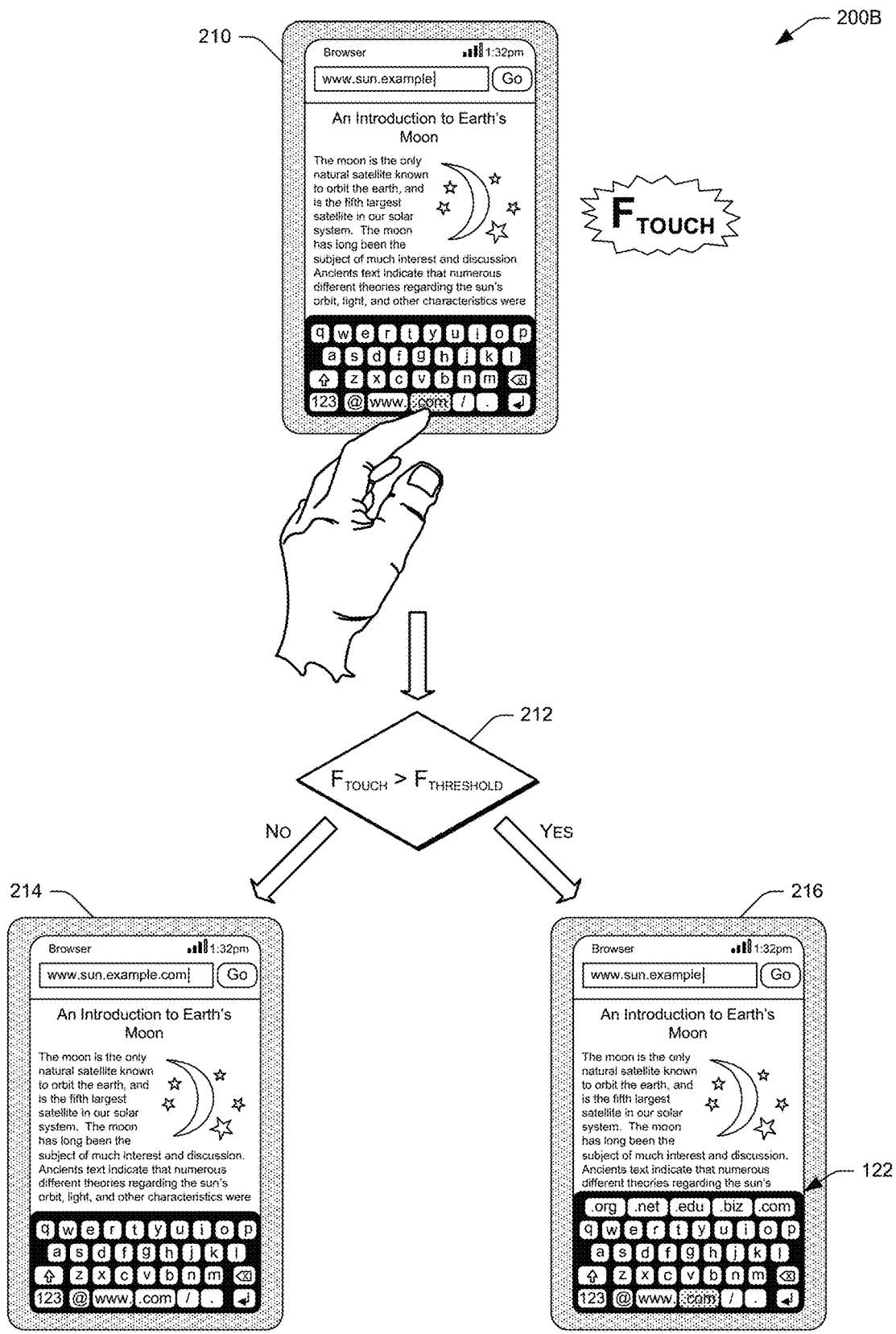

FIGS. 2A-B illustrate examples for surfacing keys related to a selected key based on a characteristic of a user's selection. FIG. 2A, for instance, illustrates an example 200A. Here, at 202 a user selects the ".com" key on the virtual keyboard 112 of the electronic device 102. In response to detecting this touch, the device identifies that the user is selecting a location of the display corresponding to the ".com" key and determines a duration of the touch.

At 204, the device 102 determines whether the duration of this touch is greater than a threshold duration. As described herein, the threshold duration represents a duration that is greater than a duration used to select a key to perform the key's primary function. That is, the threshold duration may represent an amount of time needed for a user to press and hold a key rather than simply tap the key to select the key (e.g., to cause the device to render the representation of the key on the display).

If the duration is not greater than this threshold duration, then at 206 the device 102 interprets the selection of the ".com" key as a routine selection and renders the text ".com" in the address bar, which is the current focus of the cursor. If, however, the device 102 determines at 204 that the duration of the touch is greater than the threshold duration, then at 208 the device 102 renders the additional row of keys 122 related to the selected key. Here, the keys include other top-level domains.

After the device 102 renders the additional row of keys 122, the user may select a desired key from the row (e.g., .org, .net, .edu, etc.). To do so, the user may lift her finger off of the touchscreen display and select the desired key. In other instances, meanwhile, the user may keep her finger on the display after holding down the selected ".com" key, may slide her finger (on the display) to the desired key from the additional row 122, and may remove her finger from the desired key to execute the selection. Of course, while a few examples have been described, it is to be appreciated that other implementations may allow the user to select a key from the additional row in any other suitable manner.

FIG. 2B, meanwhile, illustrates an example 200B of the device 102 rendering the additional row of keys 122 in response to a user selecting the key with an amount of force that is greater than a threshold amount of force. At 210, the device 102 again determines that the user is selecting a location of the display corresponding to the ".com" key. Here, however, the device 102 is also determining or estimating an amount of pressure of the touch. For instance, the device may implement a force-sensitive touchscreen display that is capable of measuring a force of the touch (e.g., an interpolating force-sensitive resistance (IFSR) sensor). Or, in instances where the touchscreen comprises a capacitive or other type of touch sensor, the device 102 may estimate the touch based on a variety of factors. For instance, the capacitive touch sensor may determine a surface area of the touch and the virtual-keyboard module 110 may estimate a relative force of this touch based on the determined surface area. For instance, the module 110 may deduce that a larger surface area of the touch indicates that a user is pressing harder on the display 106, which results in the relatively large area of contact on the display 106.

Regardless of whether the device 102 measures or estimates this force, at 212 the device 102 may determine whether this force is greater than a threshold amount of force. If not, then at 214 the device 102 interprets the selection of the ".com" as a routine selection and refrains from rendering the additional row. If, however, the device 102 determines at 212 that the force is greater than the threshold, then at 216 the device 102 renders the additional row of keys 122.

Figure 3A:
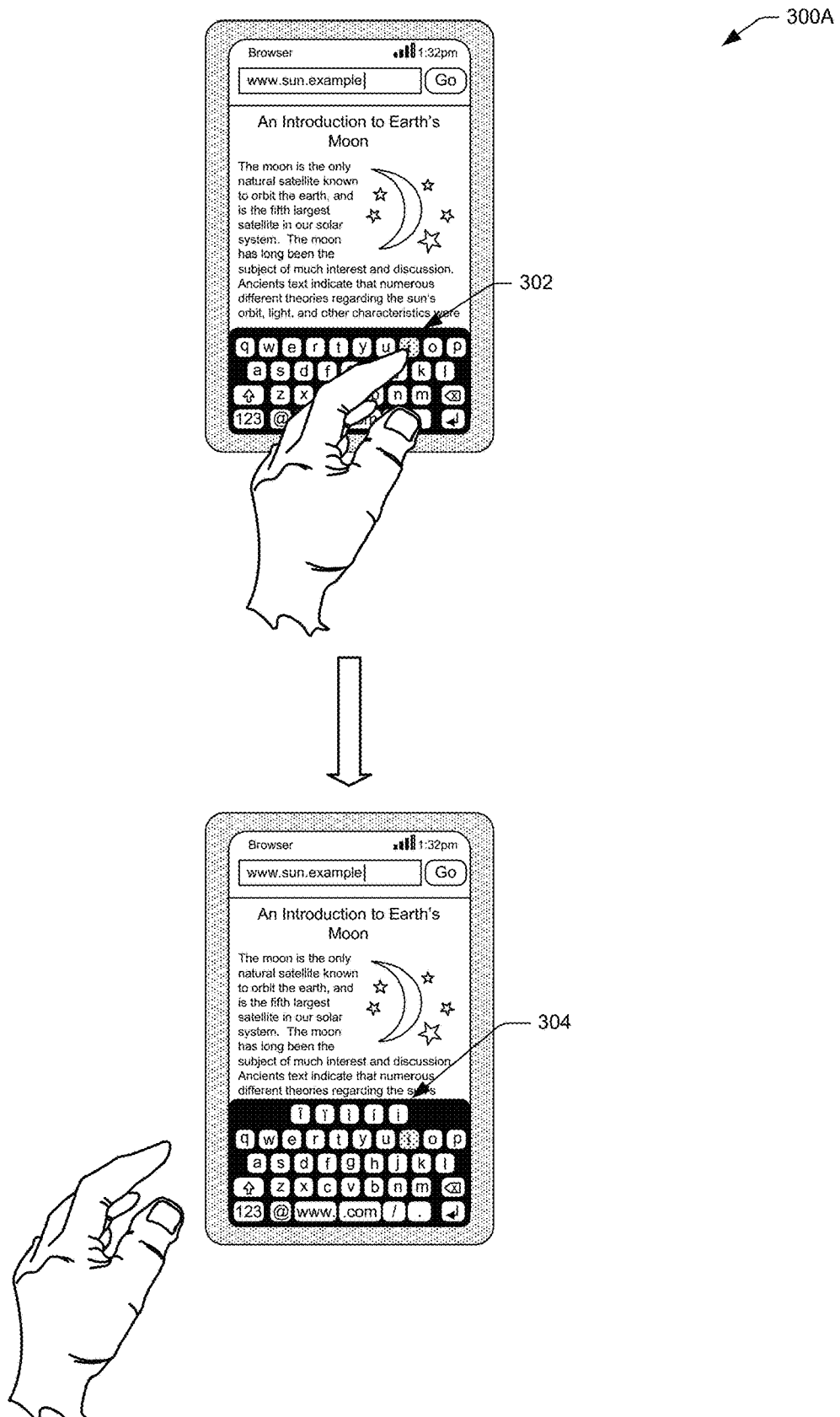
FIGS. 3A-B illustrate examples of keys that a user may select and additional keys that the device may surface in response.
Figure 3B:
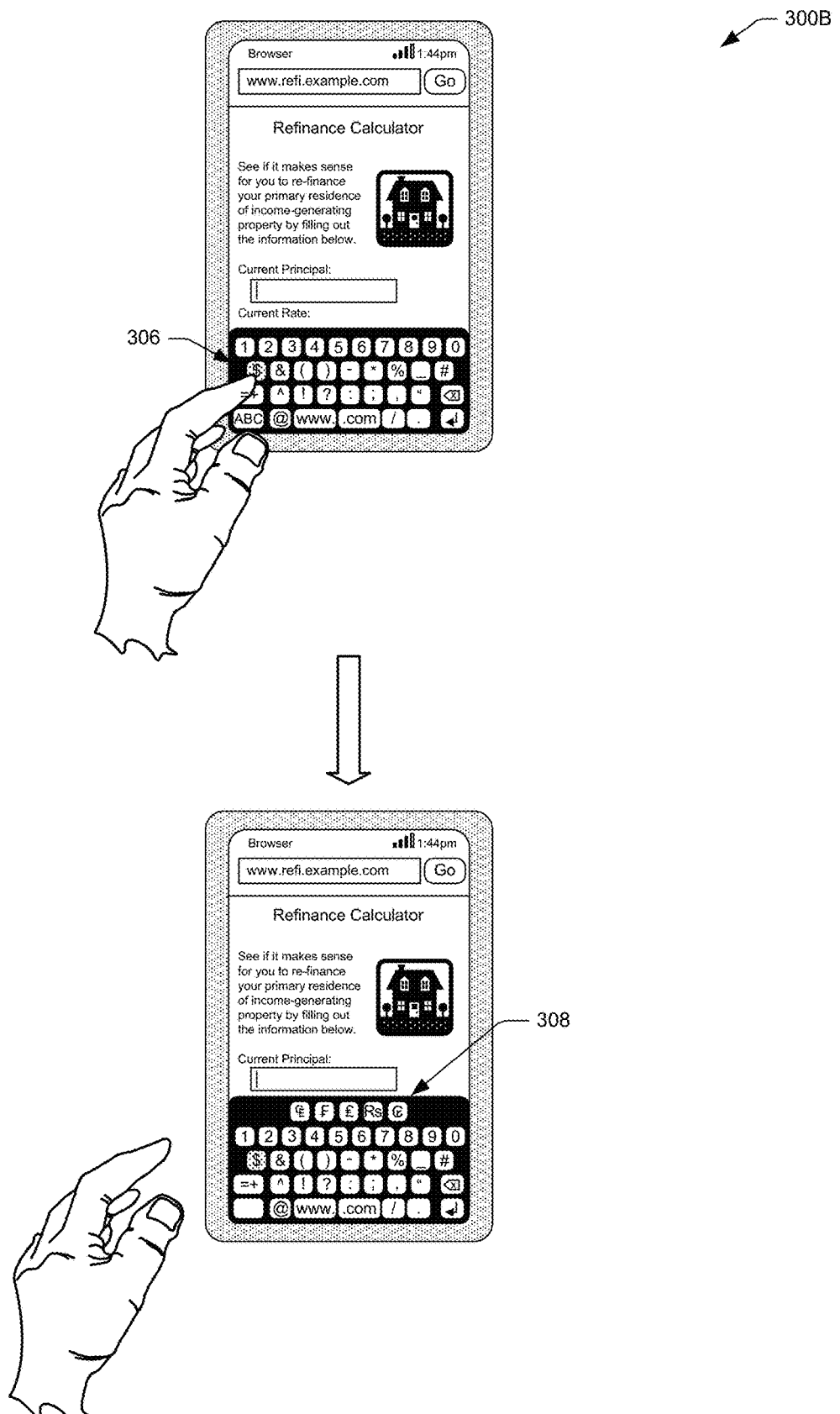

FIGS. 3A-B illustrate examples of keys that a user may select and additional keys that the device may surface in response. FIG. 3A, for instance, illustrates an example 300A of the user selecting a letter 302 and, in response, the device surfacing an additional row of keys 304, with each of the keys representing the letter and a respective diacritic. FIG. 3B, meanwhile, illustrates an example 300B of the user selecting a symbol 306 and, in response, the device surfacing an additional row of keys 308, with each of the keys representing a symbol within a same class as the selected symbol 306. In this example, the selected symbol comprises a dollar sign, the class of symbols consists of those symbols representing a form of currency, and the symbols rendered as part of the additional row 308 represent symbols for additional types of currency. While FIGS. 1, 2A-B, and 3A-C illustrate a few example types of keys that may be selected, as well as several example types of related keys that may be rendered in response, it is to be appreciated that the described techniques apply to any other combinations of keys.

Figure 4:
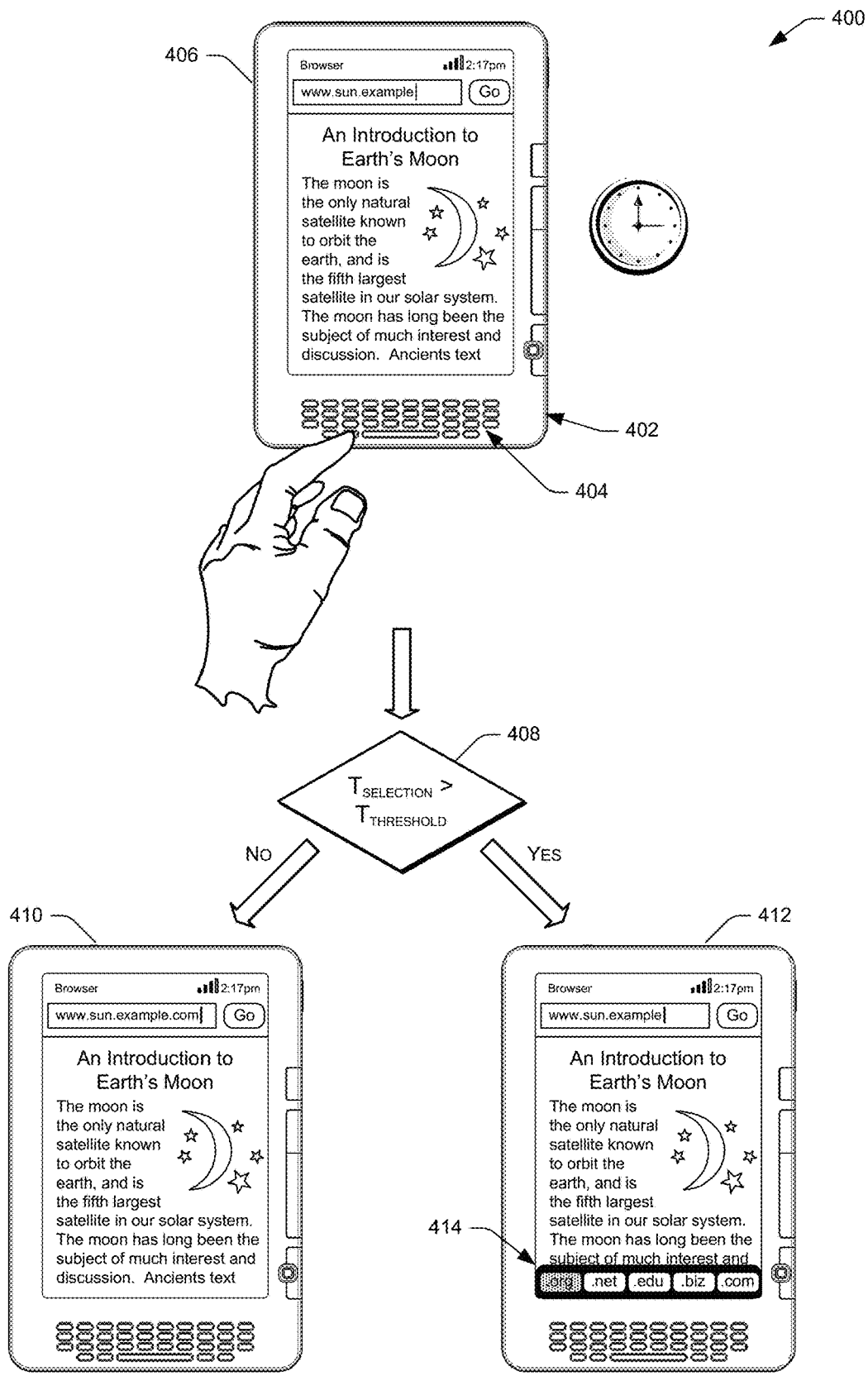
FIG. 4 illustrates another example for surfacing keys related to a selected key. Here, a user selects and holds a button on a physical keyboard and, in response to the user holding the button for an amount of time that is greater than a threshold, the device renders an additional row of keys on a display of the device. Again, the rendered keys may be related to the initially selected key.

FIG. 4 illustrates another example 400 for surfacing keys related to a selected key. In this instance, the user operates an electronic device 402 that includes a physical keyboard 404. Here, at 406 the device 402 detects when a user selects a button on the physical keyboard 404, such as a button entitled ".com". In addition, the device 402 may determine how long the user holds this ".com" button. At 408, the device determines whether the duration of the selection is greater than a threshold duration. If not, then at 410 the device 102 interprets the selection as a routine selection and renders ".com" in the address bar. If, however, the device 102 determines that the duration is greater than the threshold duration, then at 412 the device 402 renders an additional row of keys 414 on a display of the device.

In this example, the additional keys comprise domains as described with reference to the examples above. In instances where the device 402 implements a touchscreen display in addition to the physical keyboard, the user may select from these keys via the touchscreen. In other instances, the user may select from these keys using buttons on the physical keyboard 404, a five-way controller, and/or any other type of input device. In the illustrated example, for instance, the ".org" initially has the focus such that a user may select this button by, for instance, pressing down on the five-way controller. Conversely, the user may select a key to the right of the ".org" key (e.g., .net, .edu, etc.) by navigating the focus to the right with the five-way controller and selecting the desired key when the desired key has the focus.

Figure 5A:
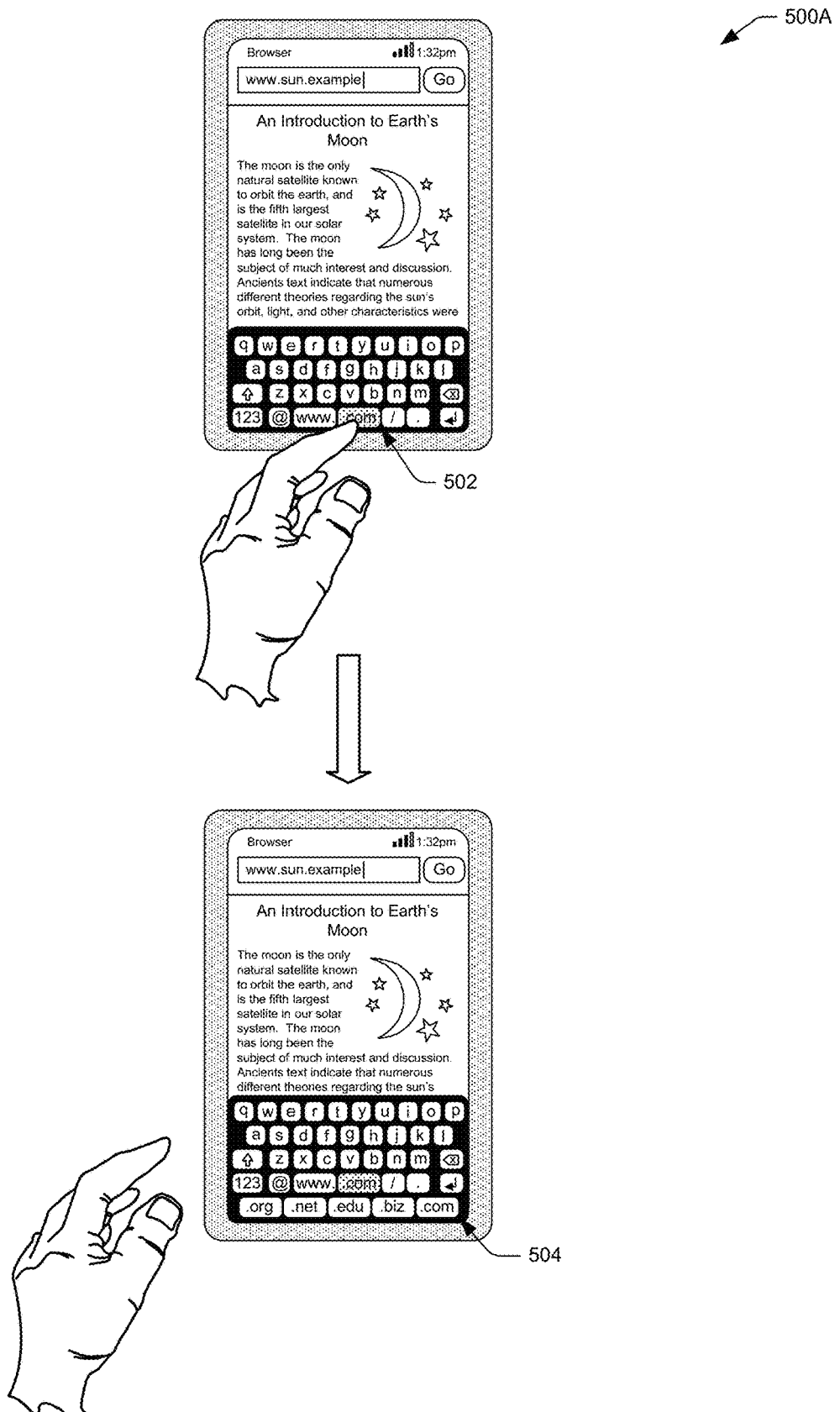
FIGS. 5A-C illustrate respectively different locations where the device of FIG. 1 may render an additional row of keys. These illustrated locations include underneath existing rows of the virtual keyboard, in between the existing rows, and in place of at least a portion of an existing row.
Figure 5B:
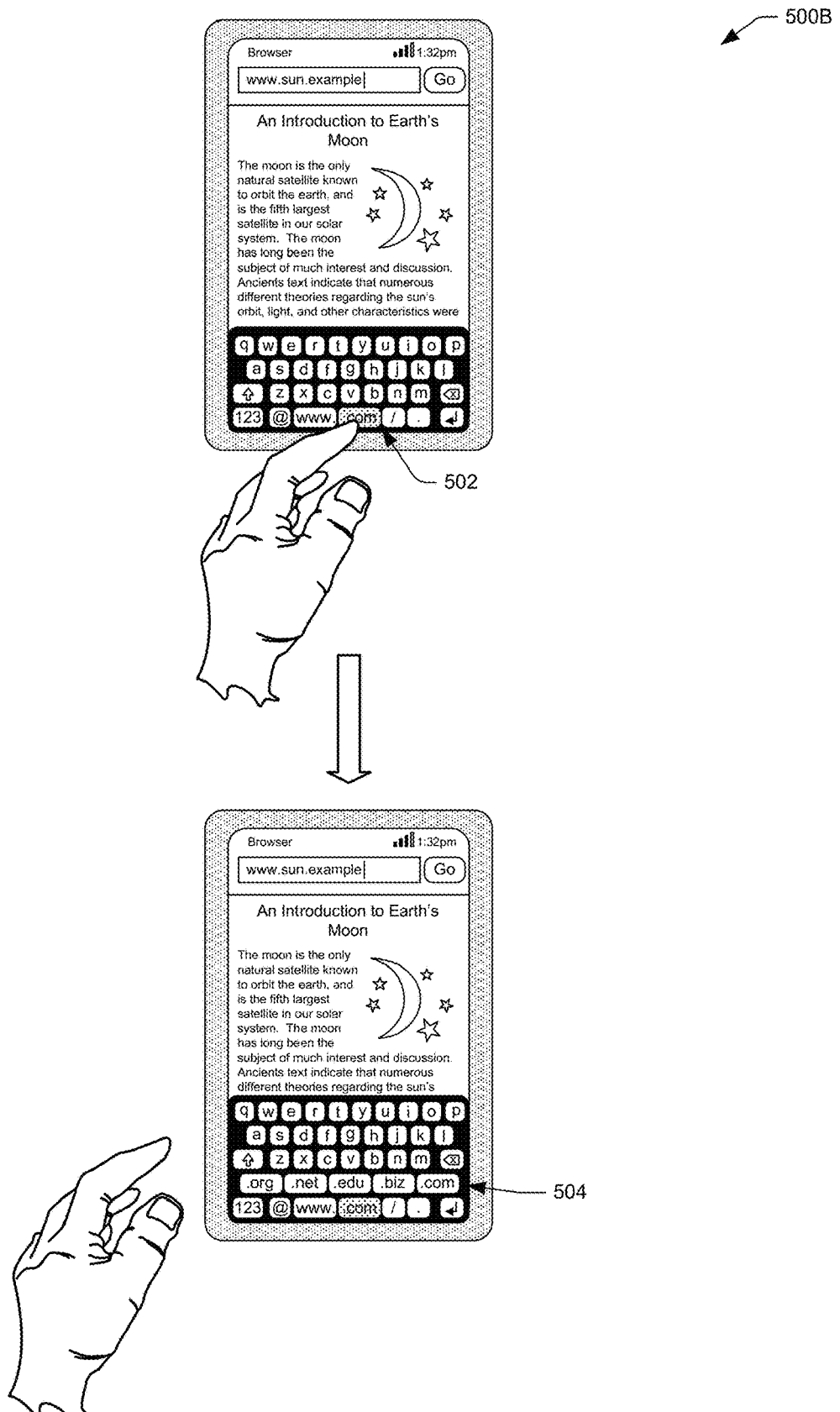
Figure 5C:
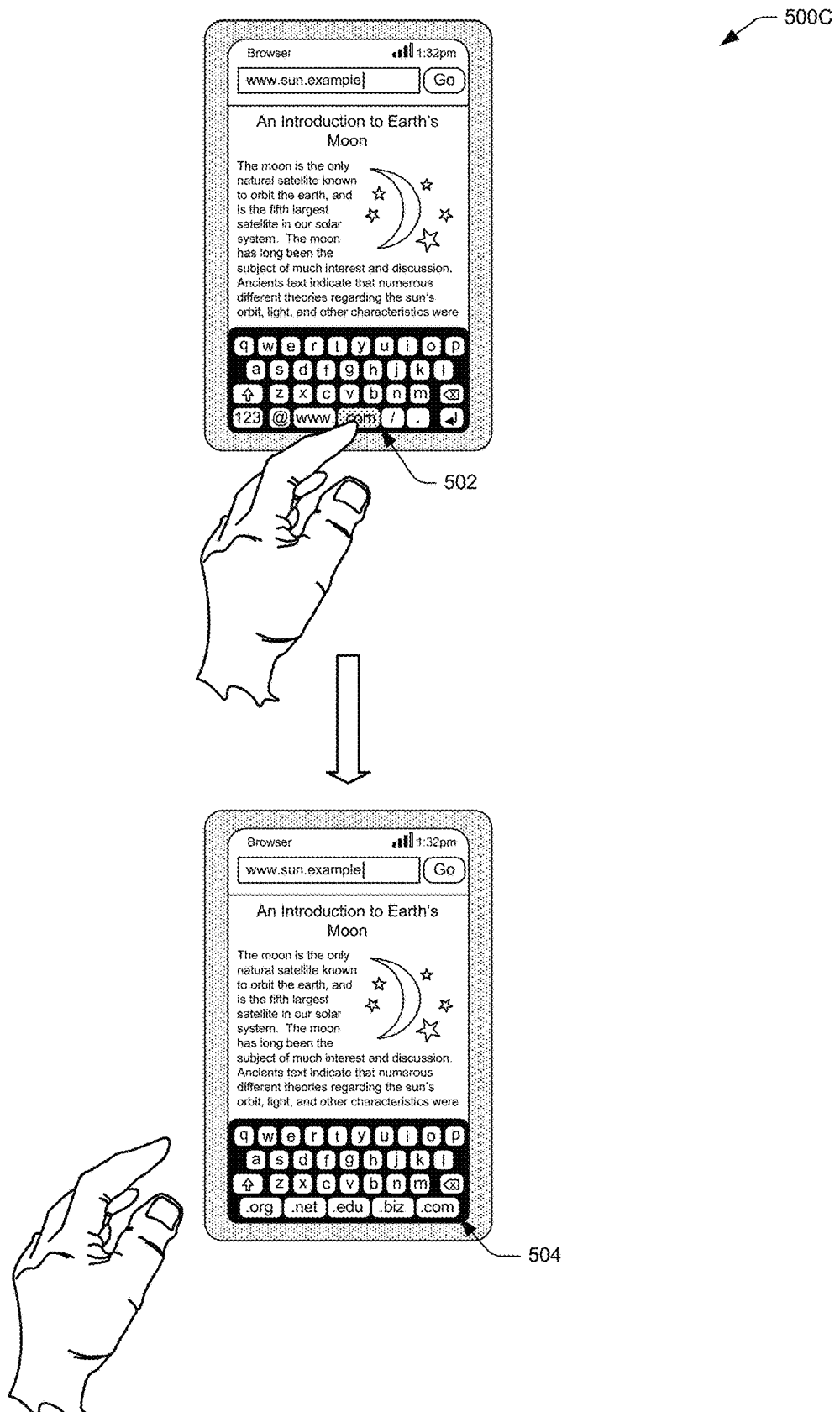

FIGS. 5A-C illustrate respectively different locations where the electronic device 102 may render an additional row of keys as part of a virtual keyboard, in addition to the example of rendering the additional row on top of the virtual keyboard as illustrated and described above. FIG. 5A, for instance, illustrates an example 500A of a user providing a touch 502 and, based on a characteristic associated with this touch 502 (e.g., duration, force, etc.), the device 102 rendering an additional row of keys 504. As illustrated, this additional row 504 appears underneath the rows of the virtual keyboard in existence prior to the touch 502. As such, each row of the virtual keyboard has essentially shifted up to accommodate the additional row 504.

FIG. 5B also illustrates an example 500B that includes the user providing the touch 502. Here, however, the device 102 has rendered the additional row in between rows of the virtual keyboard in existence prior to the touch 502. As such, some of the rows of the virtual keyboard have essentially shifted up to accommodate the additional row 504.

Finally, FIG. 5C illustrates an example 500C of the user providing the touch 502 and, in response, the device 102 rendering the additional row 504 in place of a row in existence prior to the touch. In the illustrated example, for instance, the device 102 has rendered the additional row in place of the row previously having the ".com" key. Of course, in other instances the additional row 504 may replace a portion or all of one or more other rows. Furthermore, while the techniques described herein may render an additional row of keys to allow a user to select from a set of related keys, the techniques may facilitate these selections via any other type of user interface (UI) element.

Figure 6:
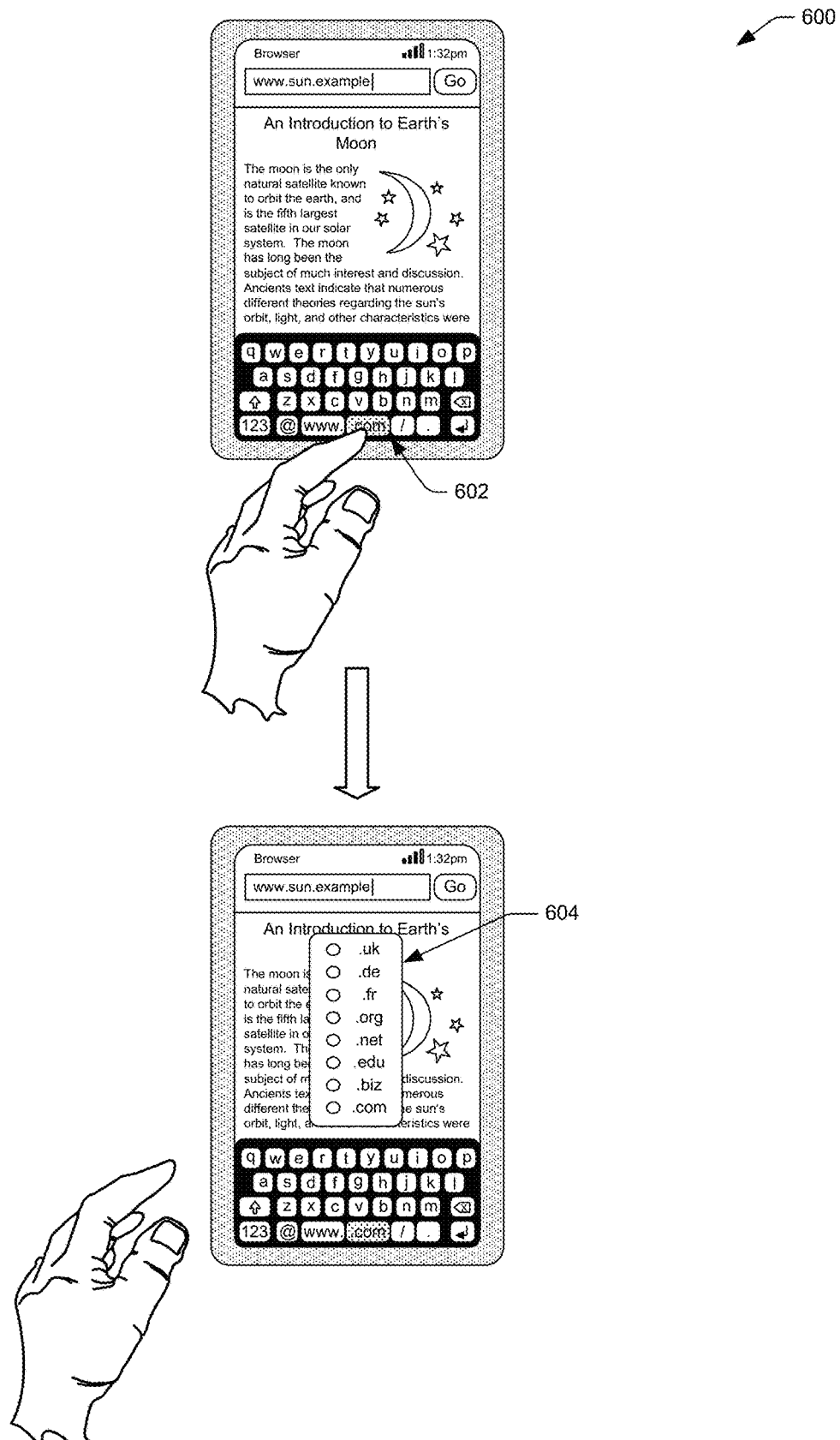
FIG. 6 illustrates an example of a user interface (UI) element other than an additional row of keys that allows a user to select from multiple different keys related to an initially selected key. Here, a user selects a domain key and, thereafter, the device renders a menu of other selectable domains.

FIG. 6, for instance, illustrates an example 600 of a UI element other than an additional row of keys that nevertheless allows a user to select from multiple different keys related to an initially selected key. Here, a user provides a touch 602 on a domain key (".com") and, based on a characteristic associated with this touch 602 (e.g., duration, force, etc.), the device 102 renders a menu 604 of other selectable domains. Here, a user of the device 102 may select the desired domain from the menu. Although the menu 604 illustrates radio buttons, other UI elements may allow selection via checkboxes, direct touch selections of the domains, swiping gestures, or in any other manner. Furthermore, while a few example UI elements have been provided, it is to be appreciated that the described electronic devices may facilitate user selections in any other manner. For instance, when a user presses and holds the ".com" button, the electronic device 102 may toggle through multiple different domains on the display, allowing the user to select a domain by removing his finger or other pointing mechanism when the device displays the desired domain.

Figure 7:
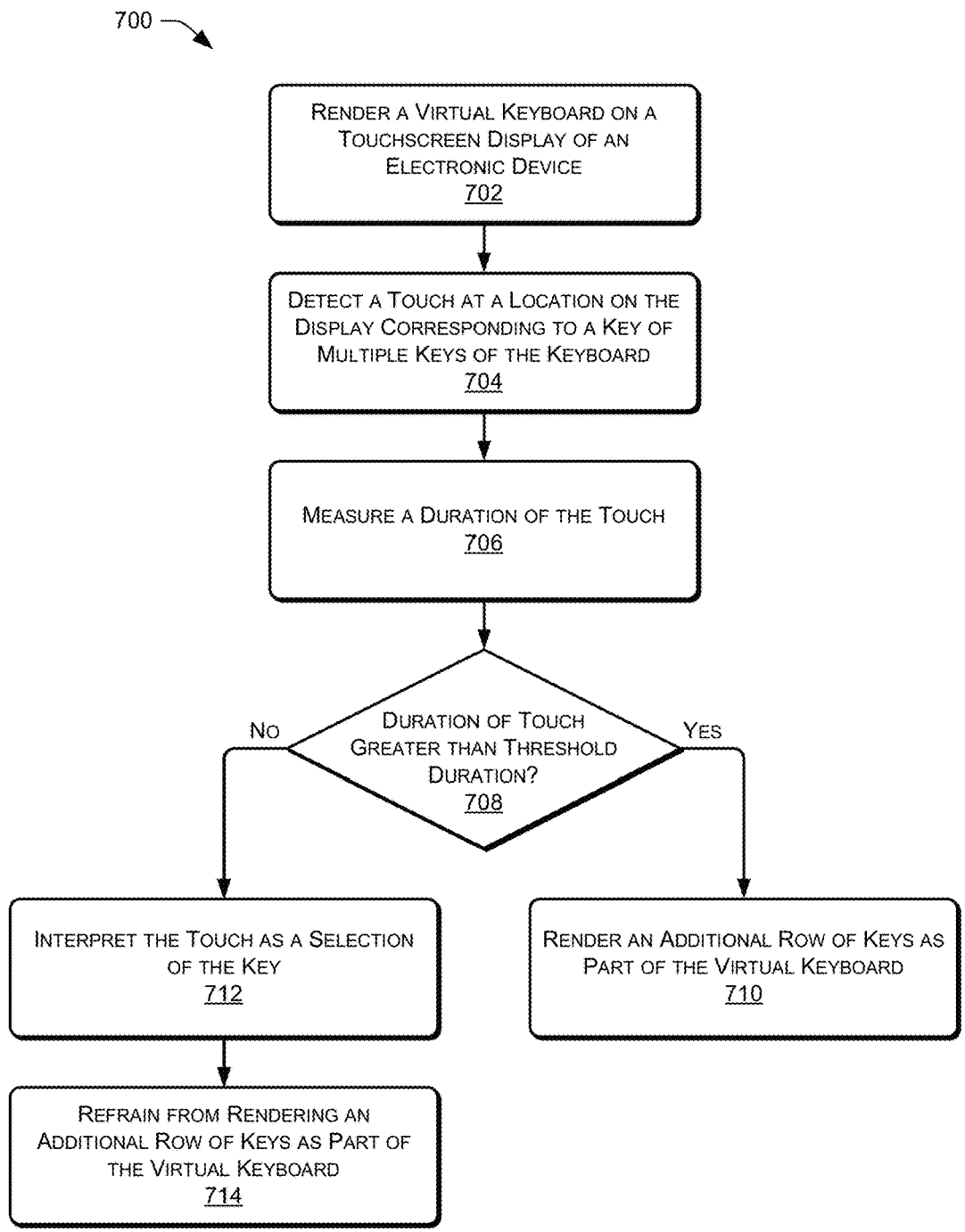
FIG. 7 illustrates an example process for rendering an additional row of keys on a virtual keyboard in response to a user selecting and holding a key of the keyboard for an amount of time that is greater than a threshold.

FIG. 7 illustrates an example process 700 for rendering an additional row of keys on a virtual keyboard in response to a user selecting and holding a key of the keyboard for an amount of time that is greater than a threshold. This process 700, as well as each process described herein, can be implemented in hardware, software, or a combination thereof. In the context of software, the illustrated operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

At 702, an electronic device renders a virtual keyboard on a touchscreen display of the electronic device, the virtual keyboard comprising multiple keys arranged in one or more rows. At 704, meanwhile, the device detects a touch at a location on the touchscreen display corresponding to a key of the multiple keys. The device then measures the duration of the touch at 706.

At 708, the device determines whether the duration of the touch is greater than a threshold duration. If so, then at 710 the device renders an additional row of keys as part of the virtual keyboard at least partly in response to determining that the duration of the touch is greater than the threshold duration, with at least one of the keys of the additional row being related to the key corresponding to the location of the touch. If, however, the duration is not greater than the threshold duration, then at 712 the device interprets the touch as a selection of the key corresponding to the location of the touch. As such, the device may also refrain from rendering the additional row of keys at 714.

Figure 8:
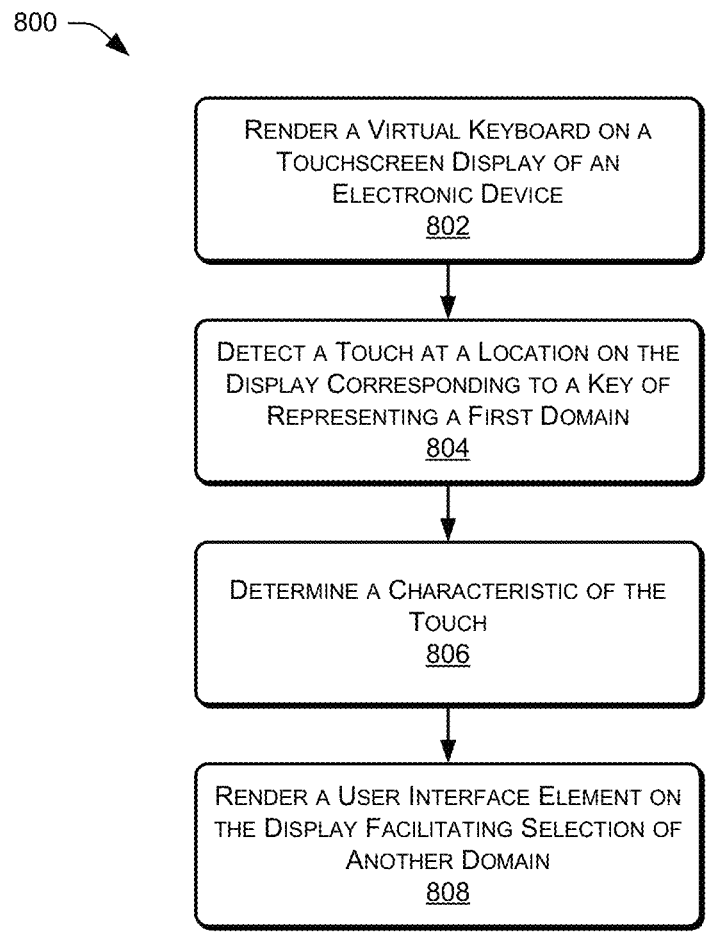
FIG. 8 illustrates an example process for rendering a user interface (UI) element facilitating selection of keys based at least in part on a characteristic (e.g., duration, force, etc.) of a user's selection of a key on a virtual keyboard.

FIG. 8 illustrates an example process 800 for rendering a UI element facilitating selection of keys based at least in part on a characteristic (e.g., duration, force, etc.) of a user's selection of a key on a virtual keyboard. At 802, an electronic device renders a virtual keyboard on a touchscreen display of the electronic device, the virtual keyboard including a key representing a first domain. At 804, the device detects a touch at a location on the touchscreen display corresponding to the key representing the first domain. At 806, the device determines a characteristic of the touch. This may include determining a duration of the touch, a force of the touch, a combination thereof, and/or any other characteristic of the touch. Finally, at 808 the device renders a UI element on the touchscreen display based at least in part on the characteristic of the touch, the UI element facilitating selection of a domain other than the first domain.

Figure 9:
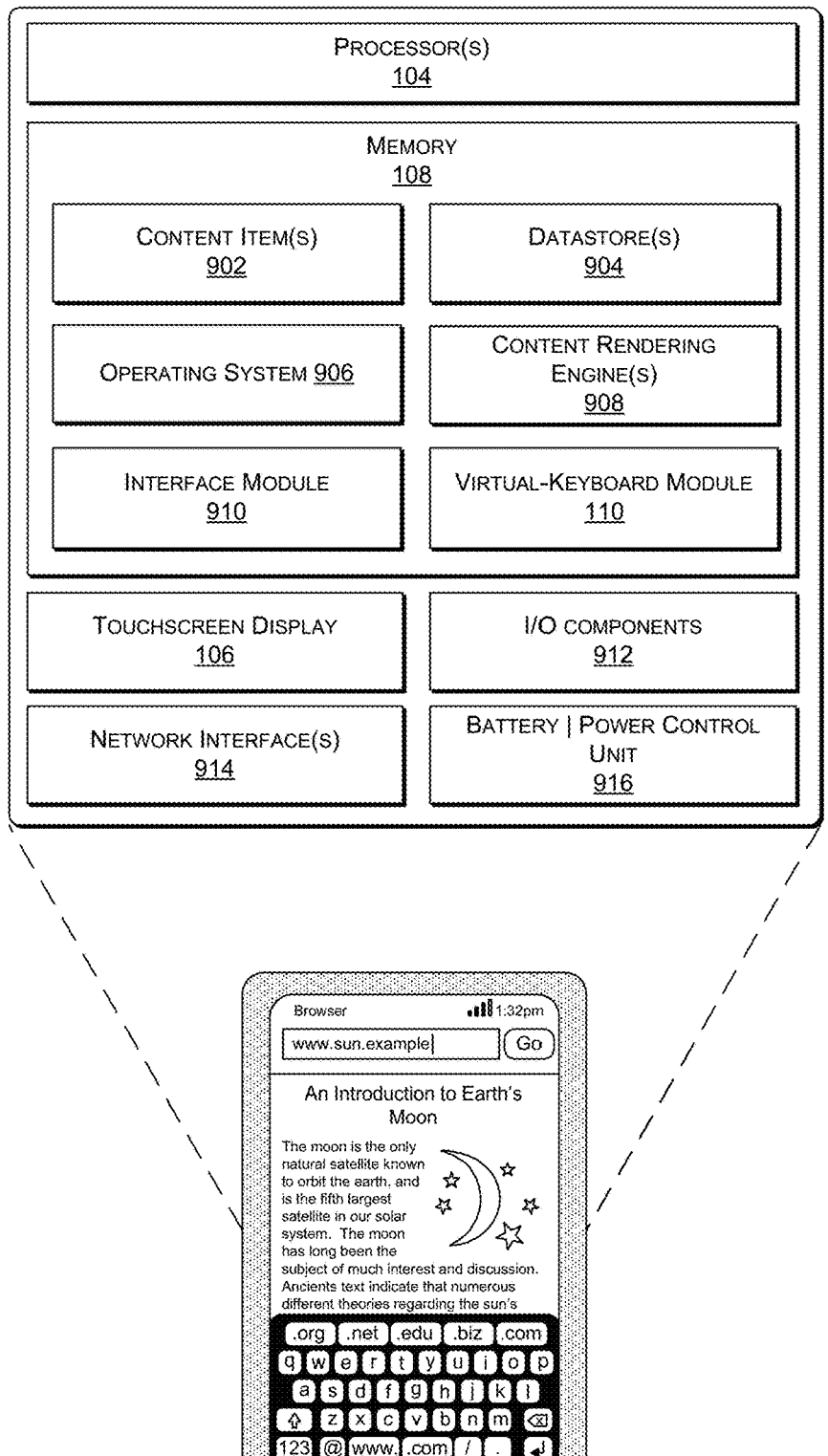
FIG. 9 illustrates selected components of an electronic device configured to implement the techniques described herein.

FIG. 9 illustrates selected components of an electronic device 102 configured to implement the techniques described herein. While FIG. 9 illustrates one implementation of an electronic device, other implementations may include more or fewer components.

In a very basic configuration, the electronic device 102 includes one or more processors 104 and memory 108, as described above. Depending on the configuration of the electronic device 102, the memory 108 may be a type of computer storage media and may include volatile and non-volatile memory. Thus, the memory 108 may include, but is not limited to, RAM, ROM, EEPROM, flash memory, or other memory technology, or any other medium which can be used to store media items or applications and data which can be accessed by the electronic device 102.

The memory 108 may be used to store any number of functional components that are executable on the processors 104. In many embodiments, these functional components comprise instructions or programs that are executable by the processors 104 and that implement operational logic for performing the actions attributed above to the electronic device 102. In addition, the memory 108 may store various types of data that are referenced by executable programs.

The memory 108 may store one or more content items 902, which may include applications, videos, electronic books, audio files, or the like. The memory may also include one or more additional datastores 904, which may store the threshold values and the criteria used to identify and sort keys described above with reference to FIG. 1.

The memory 108 may also store an operating system 906 for managing resources of the electronic device 102 and for providing common services to various applications operating on the device 102. The memory 108 may further include one or more content rendering engines 908 for rendering the content items 902 on the device 102. These engines may include engines for rendering eBooks, audio files, video files, and the like.

An interface module 910 may also reside in the memory 108 and execute on the processors 104 to provide for user operation of the electronic device 102. The interface module 910 may provide menus and other navigational tools to facilitate selection and rendering of content items. The interface module 910 may further include a browser or other application that facilitates access to sites over a network, such as websites or other sources of electronic content items.

The electronic device 102 may further include, in some instances, a touchscreen display 106, which may render some of the content items 902 and may receive and interpret user touches. The display may comprise a liquid crystal display (LCD), a light-emitting diode (LED) display, an electronic paper display, and/or any other type of display or combination of displays.

The electronic device 102 may further include various input/output (IO) components 912. Such devices may include various user interface controls (e.g., buttons, joystick, keyboard, etc.), microphones, connection ports, and so forth, as well as speakers, additional displays, and the like.

One or more network interfaces 914 may support both wired and wireless connection to various networks, such as cellular networks, radio, WiFi networks, short range networks (e.g., Bluetooth), IR, and so forth. The electronic device 102 may also include a battery and power control unit 916, which powers the device and operatively controls an amount of power, or electrical energy, consumed by the device.

The electronic device 102 may have additional features or functionality. For example, the electronic device 102 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
    one or more processors; and
    non-transitory computer-readable storage media storing instructions that are executable by one or more processors to cause the one or more processors to perform operations comprising:
        displaying a first user interface (UI) element of a virtual keyboard on a touchscreen display of a computing device;
        receiving a touch input at a first location on the touchscreen display, the first location corresponding to the first UI element;
        determining that a duration of the touch input satisfies a threshold duration;
        determining content of a webpage currently being displayed on the touchscreen display when the touch input is received;
        selecting, from multiple UI elements, at least one second UI element to include on the touchscreen display, the selecting based at least in part on the content displayed on the touchscreen display when the touch input is received; and
        displaying the at least one second UI element on the touchscreen display based at least in part on the duration satisfying the threshold duration, wherein the first UI element and the at least one second UI element represent keys of the virtual keyboard.

2. A system as recited in claim 1, wherein the at least one second UI element comprises a row of UI elements displayed in place of a portion of the first UI element.

3. A system as recited in claim 1, wherein the first UI element is associated with a first internet domain, and the at least one second UI element is associated with a second internet domain that is different than the first internet domain.

4. A system as recited in claim 1, wherein selecting the at least one second UI element comprises selecting the at least one second UI element based at least in part on a language associated with the first UI element.

5. A system as recited in claim 1, wherein the at least one second UI element is one of a plurality of second UI elements arranged in one or more rows, and wherein the plurality of second UI elements is displayed above the first UI element, underneath the first UI element, or in between the first UI element and another UI element.

6. An electronic device comprising:
    a display;
    one or more processors; and
    one or more computer-readable media storing instructions that are executable by the one or more processors to cause the one or more processors to perform operations comprising:
        detecting a touch input at a first user interface (UI) element of a virtual keyboard on the display;
        determining that a duration of the touch input satisfies a threshold duration;
        determining content of a webpage currently being displayed on the display when the touch input is detected;
        selecting, from multiple UI elements, one or more second UI elements to include on the touchscreen, the selecting based at least in part on the content displayed on the display when the touch input is detected; and
        displaying the one or more second UI elements on the display based at least in part on the duration satisfying the threshold duration, wherein the first UI element and the one or more second UI elements represent keys of the virtual keyboard.

7. An electronic device as recited in claim 6, the one or more computer-readable media storing instructions that are executable by the one or more processors to cause the electronic device to perform operations further comprising sorting the one or more second UI elements based at least in part on previous UI element selections.

8. An electronic device as recited in claim 6, wherein selecting the one or more second UI elements comprises selecting the one or more second UI elements based at least in part on a language associated with the first UI element.

9. An electronic device as recited in claim 6, the one or more computer-readable media storing instructions that are executable by the one or more processors to cause the electronic device to perform operations further comprising:
    receiving an indication that a text box displayed on the display received input;
    identifying a string of text input in the text box;
    determining one or more words based at least in part on the string of text input; and displaying at least one word of the one or more words above the first UI element.

10. An electronic device as recited in claim 9, wherein the at least one word is a first word, and the one or more computer-readable media storing instructions that are executable by the one or more processors to cause the electronic device to perform operations further comprising displaying at least a second word of the one or more words within the text box prior to receiving an input of the second word.

11. A method comprising:
- displaying a first user interface (UI) element of a virtual keyboard on a touchscreen display of an electronic device;
- receiving a touch input at a first location on the touchscreen display corresponding to the first UI element;
- determining that a duration of the touch input satisfies a threshold duration;
- determining content of a webpage currently being displayed on the touchscreen display when the touch input is received;
- selecting, from multiple UI elements, one or more second UI elements to include on the touchscreen display, the selecting based at least in part on the content displayed on the touchscreen display when the touch input is received; and
- displaying the one or more second UI elements on the touchscreen display based at least in part on the duration satisfying the threshold duration, wherein the first UI element and the one or more second UI elements represent keys of the virtual keyboard.

12. A method as recited in claim 11, wherein the one or more second UI elements comprise at least one row of second UI elements displayed above at least a portion of the first UI element.

13. A method as recited in claim 11, wherein:
- the one or more second UI elements are arranged in one or more rows;
- the one or more second UI elements are displayed under at least a portion of the first UI element; and
- displaying the one or more second UI elements causes the first UI element to shift from the first location to a second location on the touchscreen display.

14. A method as recited in claim 11, wherein selecting the one or more second UI elements comprises selecting the one or more second UI elements based at least in part on at least one of:
- a language associated with the first UI element;
- a registered location of the electronic device; or
- one or more previous UI element selections on the touchscreen display.

15. A method as recited in claim 11, wherein selecting the one or more second UI elements comprises selecting the one or more second UI elements based at least in part on a registered location of the electronic device, and wherein the first UI element indicates a top-level domain associated with the registered location of the electronic device.

16. A system as recited in claim 1, wherein the touch input corresponds to a combination of touches on the touchscreen display.

17. An electronic device as recited in claim 6, wherein the one or more computer-readable media storing instructions that are executable by the one or more processors to cause the electronic device to perform operations further comprising inserting, based at least in part on detecting removal of the touch input, an indicator of the one or more second UI elements in a text box.

18. A system as recited in claim 1, the one or more computer-readable media storing instructions that are executable by the one or more processors to cause the electronic device to perform operations further comprising:
- identifying a UI type associated with the first UI element; and
- displaying, in association with the at least one second UI element, a menu of selectable options.

19. A system as recited in claim 1, the one or more computer-readable media storing instructions that are executable by the one or more processors to cause the electronic device to perform operations further comprising:
- causing, based at least in part on the duration satisfying the threshold duration, the electronic device to toggle between multiple UI elements;
- receiving an indication that the touch input has ceased; and
- wherein selecting the at least one second UI element comprises selecting the at least one second UI element based at least in part on which of the multiple UI elements is displayed when the indication is received.

* * * * *